United States Patent [19]

Carr et al.

[11] Patent Number: 4,481,920
[45] Date of Patent: Nov. 13, 1984

[54] ROTARY INTERNAL COMBUSTION ENGINE, FLUID MOTOR AND FLUID PUMP HAVING PLANETATING GEAR PISTONS

[75] Inventors: William J. Carr, San Jose; Wallace B. Carr, Fair Oaks, both of Calif.

[73] Assignee: PDT Development & Marketing, San Jose, Calif.

[21] Appl. No.: 427,745

[22] Filed: Sep. 28, 1982

[51] Int. Cl.³ .............................................. F02B 53/00
[52] U.S. Cl. .................................. 123/246; 418/61 R
[58] Field of Search .................. 123/241, 246; 418/58, 418/61 R, 196

[56] References Cited

U.S. PATENT DOCUMENTS

| | | | |
|---|---|---|---|
| 1,093,278 | 4/1914 | Loftus | 123/246 |
| 2,478,924 | 8/1949 | Johnson | 418/61 R X |
| 4,274,374 | 6/1981 | Lee | 418/61 R X |

FOREIGN PATENT DOCUMENTS

| | | | |
|---|---|---|---|
| 733721 | 4/1943 | Fed. Rep. of Germany | 123/246 |
| 213586 | 5/1968 | U.S.S.R. | 418/58 |

*Primary Examiner*—Michael Koczo
*Attorney, Agent, or Firm*—Allston L. Jones

[57] ABSTRACT

Disclosed herein is a rotary engine/pump for use as an internal combustion engine, a fluid motor, a fluid pump or the like. Included is a ring of a plurality of radially arranged inwardly projecting convex reactor lobes, an exhaust-intake rotor concentrically mounted in the center of the ring of reactor lobes and having a shaft therethrough journalled concentrically with the axis of the reactor lobe ring, and a multiplicity of secondary rotors each with a shaft therethrough rotatably mounted equidistant from each other intermediate the reactor lobes and the exhaust-intake rotor, with their shafts parallel to the shaft of the exhaust-intake rotor. Each of the secondary rotors has three radially outwardly extending legs defining a concave cavity between each pair of legs. Separating each of the secondary rotors are segments also mounted intermediate the reactor lobes and the exhaust intake rotor to limit the working area of the turbine to substantially the cavities between each pair of legs of each of the secondary rotors. A planetary gear set is attached to each of the shafts of the exhaust intake rotor and the secondary rotors to provide reverse rotation of the entire internal structure of the engine/pump to the rotational direction of the secondary rotors individually. Intake and exhaust from the engine/pump is controlled by means of a set of valve plates, one rotating and two stationary to permit the proper timing of the inlet and exhaust functions. Further, in the fluid pump and fluid motor configurations, additional inlet and discharge ports are disclosed extending through each of the reactor lobes into the internal portion of the engine/pump for providing a secondary path for inputing and discharging the fluid to and from the operational engine/pump area. There is also disclosed a means for adjusting the compression within the operating portions of the engine/pump during its use as an internal combustion engine.

19 Claims, 14 Drawing Figures

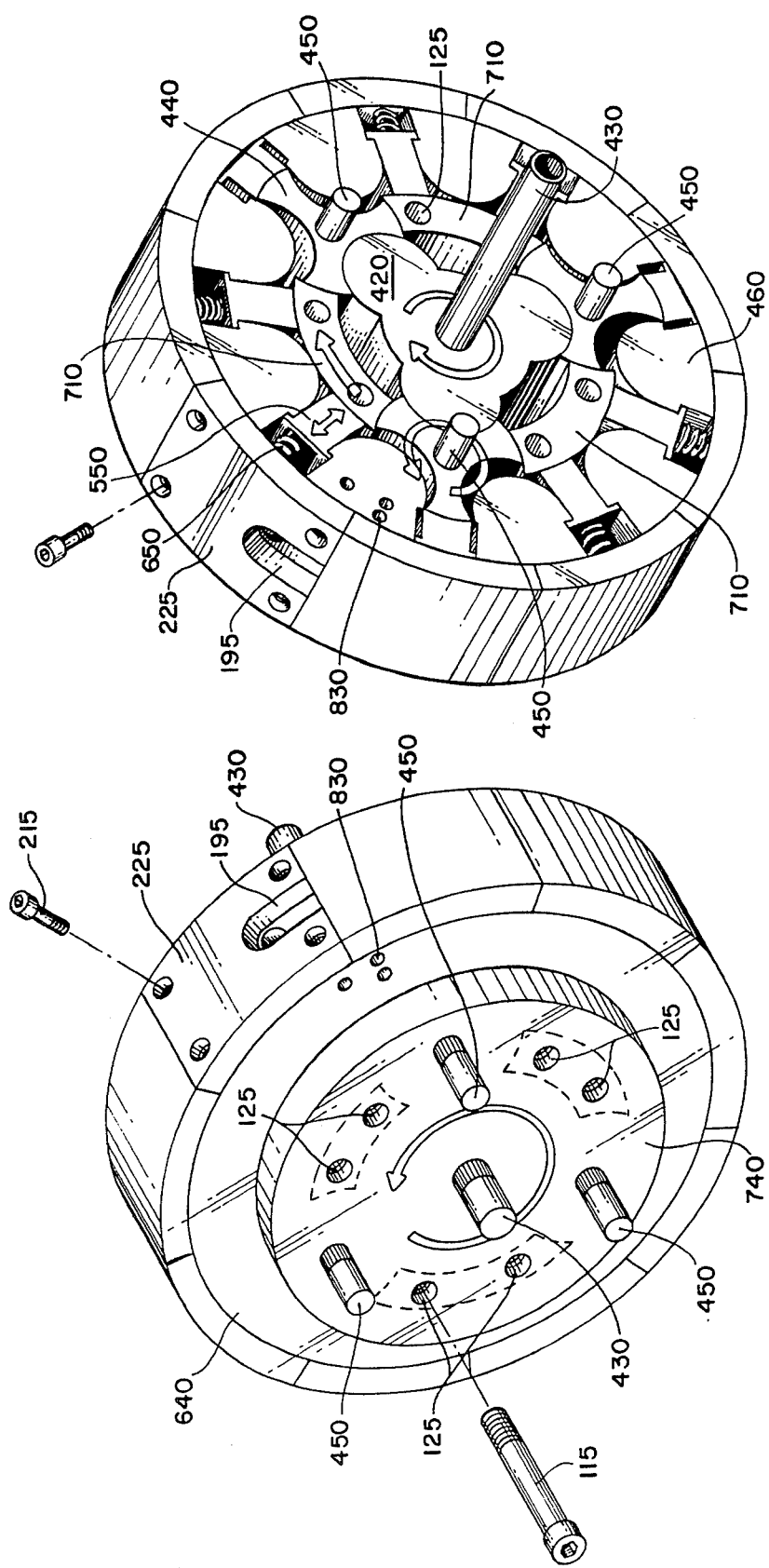

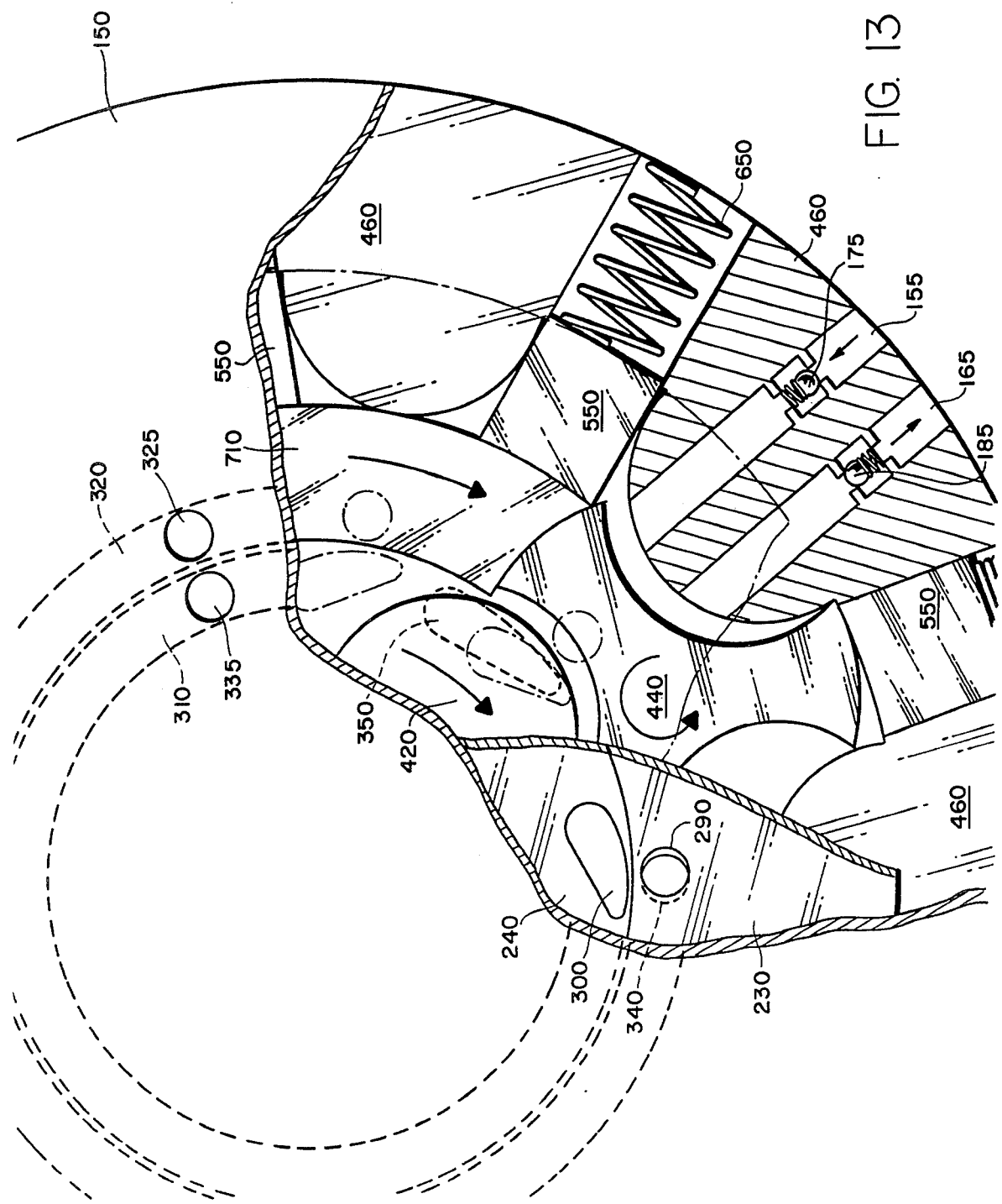

ROTARY INTERNAL COMBUSTION ENGINE, FLUID MOTOR AND FLUID PUMP HAVING PLANETATING GEAR PISTONS

BACKGROUND OF THE INVENTION

1. Field of the Invention

This invention is related to a Rotary engine/pump having utility as a combustion engine, fluid pump, fluid motor or the like.

2. Prior Art Relative to the Invention

The reciprocating piston engine, and the Wankel rotary engine which was developed as an alternative for the reciprocating piston engine, each suffer from a poor, variable, moment arm leverage condition. The piston engine encounters low volume of displacement with high mass, as related to machinery bulk, and high internal inertial losses. The Wankel design encounters a high "wetted" combustion area and cooling inconsistancies which degrade its efficiency.

Each of these engines are unbalanced and yield a good degree of vibration during operation. Further, the induction and exhaust timing, and the compression of these engines cannot easily be varied, and certainly not during operation. In addition, cooling of these engines is also difficult since their principal working parts cannot be cooled directly by an external source of coolant.

SUMMARY OF THE INVENTION

In accordance with the illustrated embodiment, the present invention provides a rotary engine/pump including a ring of a plurality of radially arranged inwardly projecting convex reactor lobes, with an exhaust-intake rotor having a shaft therethrough journalled concentrically with the axis of the reactor lobe ring. The exhaust-intake rotor has convex lobes, and the engine/pump further includes a multiplicity of secondary rotors each with a shaft therethrough rotatably mounted equidistant from each other intermediate the convex lobes of the reactor lobes and the exhaust-intake rotor, with their shafts parallel to the shaft of the exhaust-intake rotor. Each of the secondary rotors have three radially outwardly extending legs defining a concave cavity between each pair of legs. The engine/pump also includes a gear plate adjacent one end of the reactor lobe ring. One end of the shafts of each of the exhaust-intake rotor and the secondary rotors are journalled through the gear plate. Segments, which extend into the reactor lobe ring intermediate the convex reactor lobes and the exhaust-intake rotor are formed as part of the gear plate. The function of these segments is to separate the secondary rotors from each other and limit the working area of the engine/pump to substantially the cavities between each pair of legs of each of the secondary rotors. Mounted on the shafts of the four rotors which extend through the gear plate is a planetary gear set to provide rotational movement to the various rotors and the gear plate with each of the secondary rotors rotating in one direction on their shafts while the entire assembly rotates in the opposite direction. Further, the number of lobes on the exhaust-intake rotor is equal to the number of secondary rotors and the number of reactor lobes is equal to three times the number of secondary rotors.

Also included are pressure seals located in the reactor lobe ring intermediate the rector lobes and extending inward to assist in maintaining a seal between the segments and the secondary rotor. Additionally, the concave cavities of the secondary rotors are sized and shaped to substantially mate with the reactor lobes and the lobes of the exhaust-intake rotor.

In all configurations, valving is provided adjacent the other end of the reactor lobe ring for intake and discharge of fluids and gases from the operating portion of the engine/pump. To provide means for adjusting the timing of the intake and discharge from the operating portion of the engine/pump, the valves typically consist of a rotating valve plate adjacent the other end of the reactor lobe ring, with the rotating valve plate defining a preselected pattern of intake and discharge ports, which, when aligned with stationary intake and discharge ports, provides the path to or from the engine/pump at the times established by the stationary ports. The stationary ports are located in a stationary valve plate which is adjacent the rotating valve plate and both valve plates are then enclosed by a front case cover which closes on the outer perimeter of the reactor lobe ring. The front case cover also defines intake and discharge ports, each of which communicate with an annular groove disposed adjacent to the stationary ports. To allow for the individual timing of the intake and the discharge of the gas or fluid to or from the engine/pump, the stationary valve plate can be made of two concentric valve plates. Whether one or two stationary valve plates are used, timing adjustment means affixed to that plate, or those plates can be extended through the front case cover to permit adjustment. In an internal combustion engine where a spark is necessary to ignite the fuel, the other end of the shaft of the exhaust intake rotor is journalled within, and passes through, the front case cover, and has attached thereto, a distributor means for distributing the necessary electrical impulse to the spark plugs which are mounted, and extend through, each of the reactor lobes.

In another embodiment of the present invention, there is disclosed means for adjusting the internal compression of the engine/pump to match the particular type of fuel being supplied to the engine. This may be accomplished by slidably mounting a cylinder which may include a spark plug within each reactor lobe and thereby varying the depth at which the cylinder is inserted to vary the volume of the cavity during the compression plane of the operation. This adjustment of the positioning of the compression cylinder of done by means of a cam rail which is attached to each of the compression cylinders to make the necessary adjustment for the fuel being used in that specific cavity.

In yet another embodiment where the engine/pump is being used as a fluid motor or a fluid pump it is desirable to have a second set of inlet and discharge ports. This will permit the double functioning of the engine/pump. In the internal combustion phase there are four cycles. In the fluid motor or fluid pump operation of the device there are only two steps in the cycle, the injection or inputting of the fluid and the discharge of the fluid. Therefore it is possible to use the positioning of the secondary rotors that were in the internal combustion phase providing the compression and ignition portion as a discharge and intake portion of the cycle. To perform this function it is necessary to include through each rotor an inlet and a discharge port. To prevent the flow of the fluid in the direction opposite that which is desired, unidirectional flow means can be provided in each of these inlet and discharge ports through the reactor lobes. The unidirectional flow means may simply be a ball check valve in each port to limit the fluid flow to a single selected direction in each of the ports. Another approach is to divide each port with a septum creating two substantially L-shaped portions of the port opening into the other side of each reactor lobe. Then adjacent to the septum divided openings through the side of the reactor lobe, one must provide a channel in the adjacent valve means to couple the two portions of the port during the desired period for inletting or discharging of the fluid to or from the operating portions of the engine/pump.

BRIEF DESCRIPTION OF THE FIGURES

FIG. 4 is a first perspective view of the reactor assembly of the engine/pump of the embodiment of FIG. 1.

FIG. 5 is a second perspective view of the reactor assembly of the engine/pump of the embodiment of FIG. 1.

FIGS. 12 and 13 each show a close-up partial cutaway plane view of the engine/pump of FIG. 1 having alternate inlet and discharge port means.

DESCRIPTION OF THE PREFERRED EMBODIMENT

The positive displacement engine/pump embodiment discussed herein is truly a rotary engine with all major components in complete equilibriium at all times resulting in minimal vibration during operation. Additionally, the engine has constant length moment arms resulting in high torque values at low speeds and a relatively constant torque curve over a broad speed range.

The ratio of the external engine size to internal working volume is much smaller than any other engine design with a very high volumemetric efficiency as a result of the near zero chamber volume at the beginning of the intake event. Further, the engine is of minimal complexity as a result of the small number of engine parts.

This design lends itself to use as either an internal combustion engine or as a fluid pump/motor. As an engine it can be adjusted during operation to burn any type of fluid fuel either with a conventional spark or compression ignition. The majority of the internal parts may be cast, machined, or extruded of either steel, aluminum alloys, ceramic material, or the like. To increase the displacement of the engine/pump one can do any one or combination of three things—lengthen the turbine, increase the diameter of the engine/pump, or increase the number of secondary rotors and related parts.

Additionally, nearly all engine/pump parts can be cooled directly by using hollow shafts for the rotating parts and pumping a cooling fluid therethrough, and using cooling fins on the reactor body.

Figure 1:
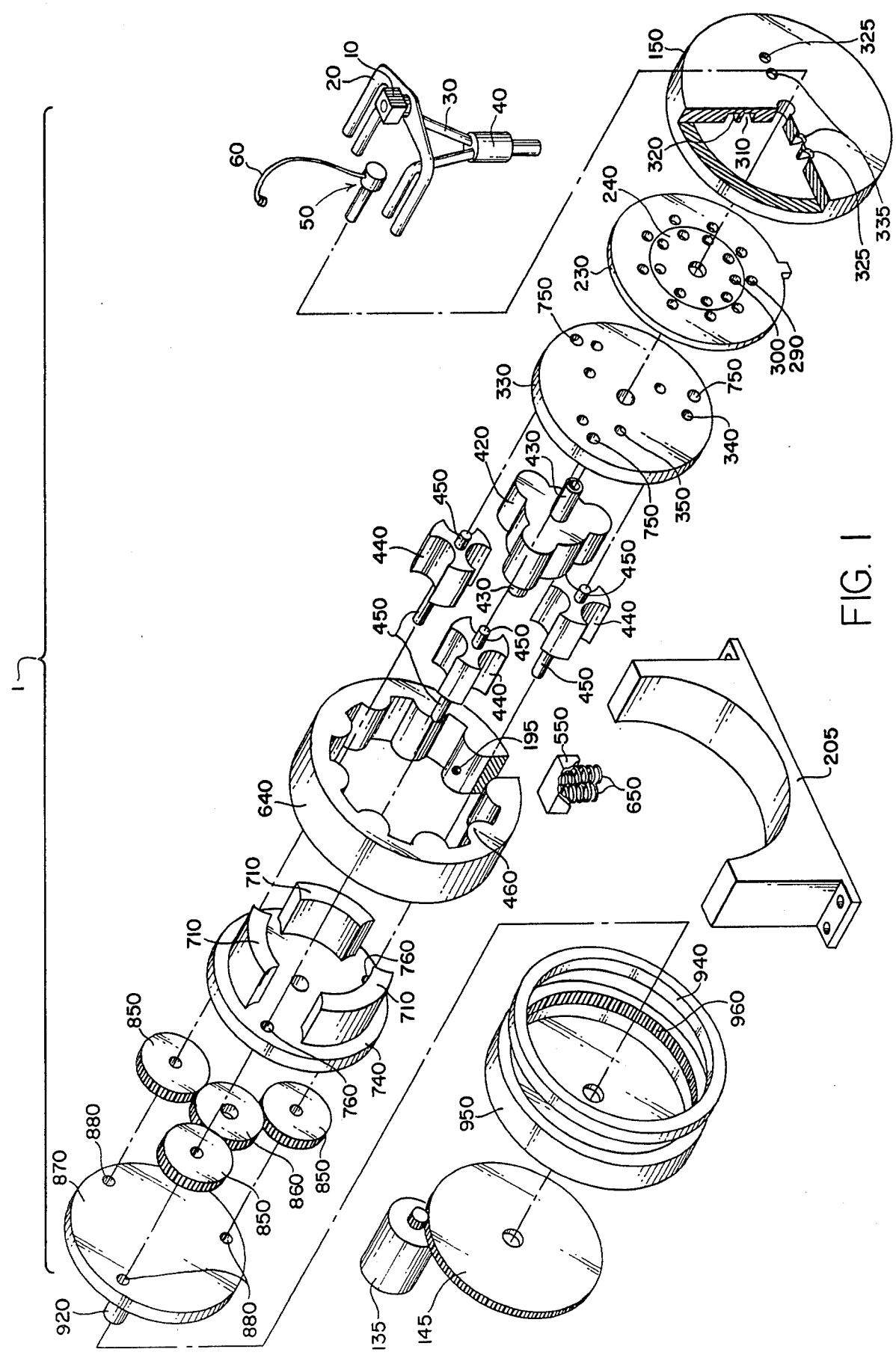
FIG. 1 is a simplified exploded perspective view of the engine/pump of the preferred embodiment of the present invention.

Referring to FIG. 1 there is shown an exploded view of the positive displacement engine/pump 1 of the present invention. Engine/pump 1 includes a carburetor 10 mounted on intake manifold 20 which is shown adjacent to exhaust manifold 30 having attached thereto a muffler 40. Shown between intake and exhaust manifolds 20 and 30 is ignition system and distributor 50 with a typical spark plug wire 60 extending therefrom.

Next is shown front case cover 150 defining intake ports 325 and exhaust ports 335 to which intake manifold 20 and exhaust manifold 30 respectively are coupled. Additionally, front case cover 150 has the upper right hand quadrant cut away to reveal the exhaust annular groove 310 and intake annular groove 320 which couple to exhaust ports 335 and intake ports 325 respectively. Next there are shown two stationary valve plates, intake stationary valve plate 230 and exhaust stationary valve plate 240. Following the stationary valve plates there is a rotating valve plate 330.

Next there is shown exhaust/intake rotor 420 surrounded by three secondary rotors 440 all which are nested within reactor lobe assembly 640. The valve plates 330, 230, 240 and the front case cover 150 each mount forward of reactor lobe assembly 640 with shaft 430 of exhaust/intake rotor 420 being journalled within the central hole of rotating valve plate 330, stationary exhaust valve plate 240 and front case cover 150. A portion of shaft 430 extends outward beyond the forward surface of front case cover 150 and attached thereto is distributor 50. Secondary rotor shafts 450 extend into and are journalled with bearings 750 within rotating valve plate 330.

Figure 2:
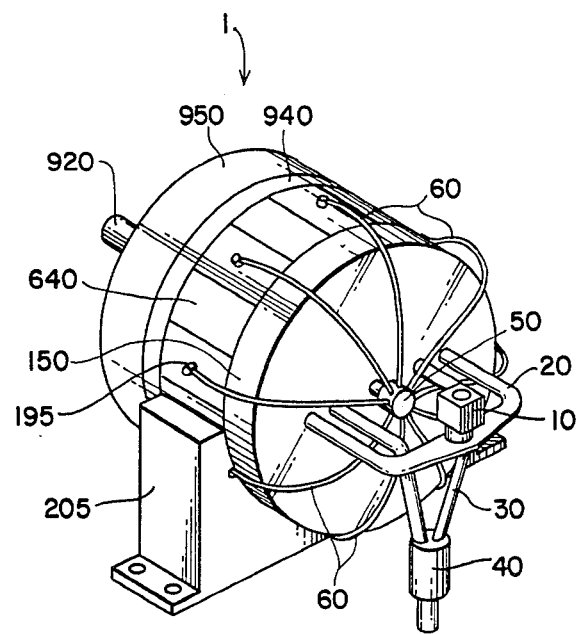
FIG. 2 is a perspective view of a fully assembled engine/pump of the embodiment of FIG. 1.

Reactor lobe assembly 640 is shown having 9 internal reactor lobes 460 with a typical spark plug access hole 195 shown extending through one of them. Also mounted within reactor lobe assembly 640 and not shown in the simplified view is a pressure seal 550 and spring 650 assembly which is placed between each reactor lobe 460. Reactor lobe assembly 460 is shown cut away in the location of one of the pressure seal assemblies. Extending into reactor lobe assembly 640 from the opposite side are segments 710 which are mounted on gear plate 740. Segments 710 are the means of separation for combustion rotors 440. The other end of secondary rotor shafts 450 extend into and are journalled within gear plate bearings 760. The opposite end of exhaust/intake rotor shaft 430 is journalled within and extends through the center hole in gear plate 740. Press fit onto exhaust/intake rotor shaft 430 is exhaust/intake rotor sun gear 860. Surrounding exhaust/intake rotor sun gear 860 and equidistant from each other are three secondary planetary rotor gears 850. Each of secondary rotor planetary gears 850 are press fit on secondary rotor shafts 450 which are journalled within bearings 760 in bearing plate 740. Shafts 450 then extend into and are captured by bearings 880 in drive plate 870. On the opposite surface of drive plate 870 is output shaft 920. On the back end of engine/pump 1 surrounding the parts discussed above is spacer 940 which surrounds gear plate 740. Surrounding secondary rotor planetary gears 850 is rear case cover 950 defining therewith ring gear 960 which meshes with each of combustion rotor planetary gears 850. Output shaft 920 of drive plate 870 is journalled through a central bearing in rear case cover 950 and then fixedly mounted thereto is flywheel 145. Around the periphery of flywheel 145 are gear teeth which mesh with the output gear on starter motor 135 during the starting phase of engine/pump 1. The entire assembly is then mounted on engine mount 205 in the region of reactor lobe assembly 640 by any known means. In FIG. 2 there is shown a fully assembled view of engine/pump 1 of FIG. 1. In this view it can be seen that each of reactor lobes 460 accommodates a spark plug.

Figure 3:
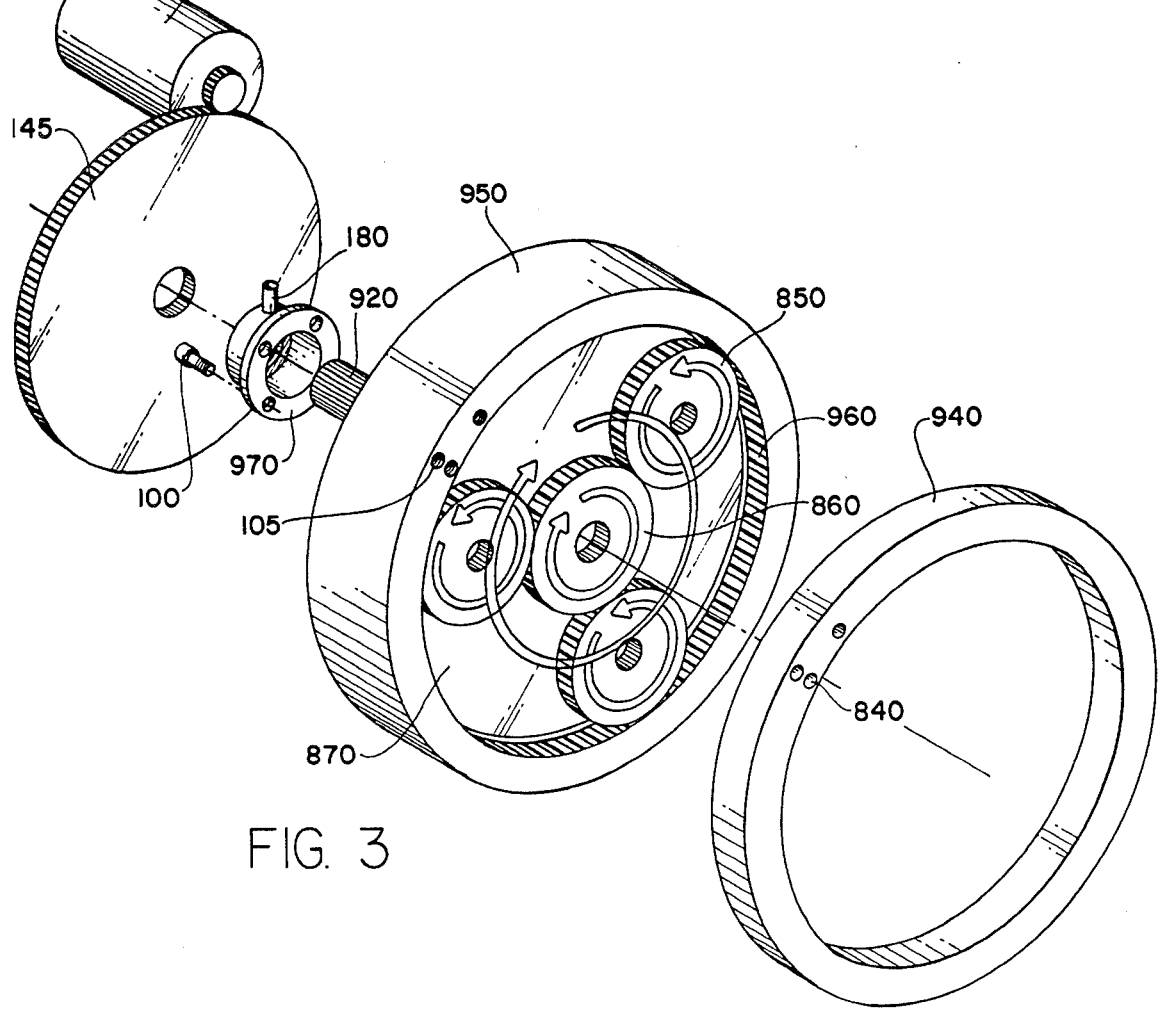
FIG. 3 is an exploded, detailed perspective view of the output end of the engine/pump of the embodiment of FIG. 1.

Referring now to FIG. 3 there is shown in greater detail the power delivery section of engine/pump 1. The power delivery section includes starter motor 135, flywheel 145, rear case cover 950 including secondary rotor planetary gears 850 and exhaust intake rotor planetary gear 860 nested therewithin and spacer 940. Also shown in FIG. 3 are typical engine/pump 1 assembly holes 840 in spacer 940 and typical tapped assembly holes 105 in rear case cover 950. Further there is shown coolant discharge means 970 including coolant outlet tube 180. The coolant discharge means is attachable by means of bolts 100 to the output shaft side of rear case cover 950. For use as an internal combustion engine, engine/pump 1 is set into motion by starter motor 135 which engages flywheel 145 during the starting operation. Flywheel 145 is fixedly attached to output shaft 920 by typical means. As viewed in FIG. 5 this results in a clockwise movement of output shaft 920 and drive plate 870 to which it is affixed. The clockwise movement of drive plate 870 causes secondary rotor planetary gears 850 to individually rotate counterclockwise and clockwise as a unit within ring gear 960. In addition the counterclockwise movement of secondary rotor planetary gears 850 causes the clockwise rotation of exhaust intake rotor planetary gear 860.

FIG. 4 shows the reactor lobe assembly of turbine 1 from the gear plate 740 side. Items shown in FIG. 4 which have not been discussed before include a typical pressure seal spring reactor 225, affixed to the reactor lobe assembly 640 by means of screws 215. Pressure seal spring reactor 225 defines spark plug access hole 195 therethrough. In addition, typical assembly holes 830 are also shown passing through reactor lobe assembly 640. Additionally, holes 125 in gear plate 740 are shown. Holes 125 extend through gear plate 740 in the region of segments 710 with bolts 115 being utilized to fasten rotating valve plate 330 in a juxtaposed position to segments 710 on the opposite side of reactor lobe assembly 640. Continuing the start up discussion begun above, it can be seen that the rotational motion provided by the starting motor to gears 850 and 860 (FIG. 3) impart that rotational motion to shafts 430 and 450, as well as, gear plate 740. As viewed in FIG. 4, the rotation of gear plate 740 will be in the counterclockwise direction as will be the rotation of shaft 430. The three shafts 450 will rotate clockwise.

Figure 6:
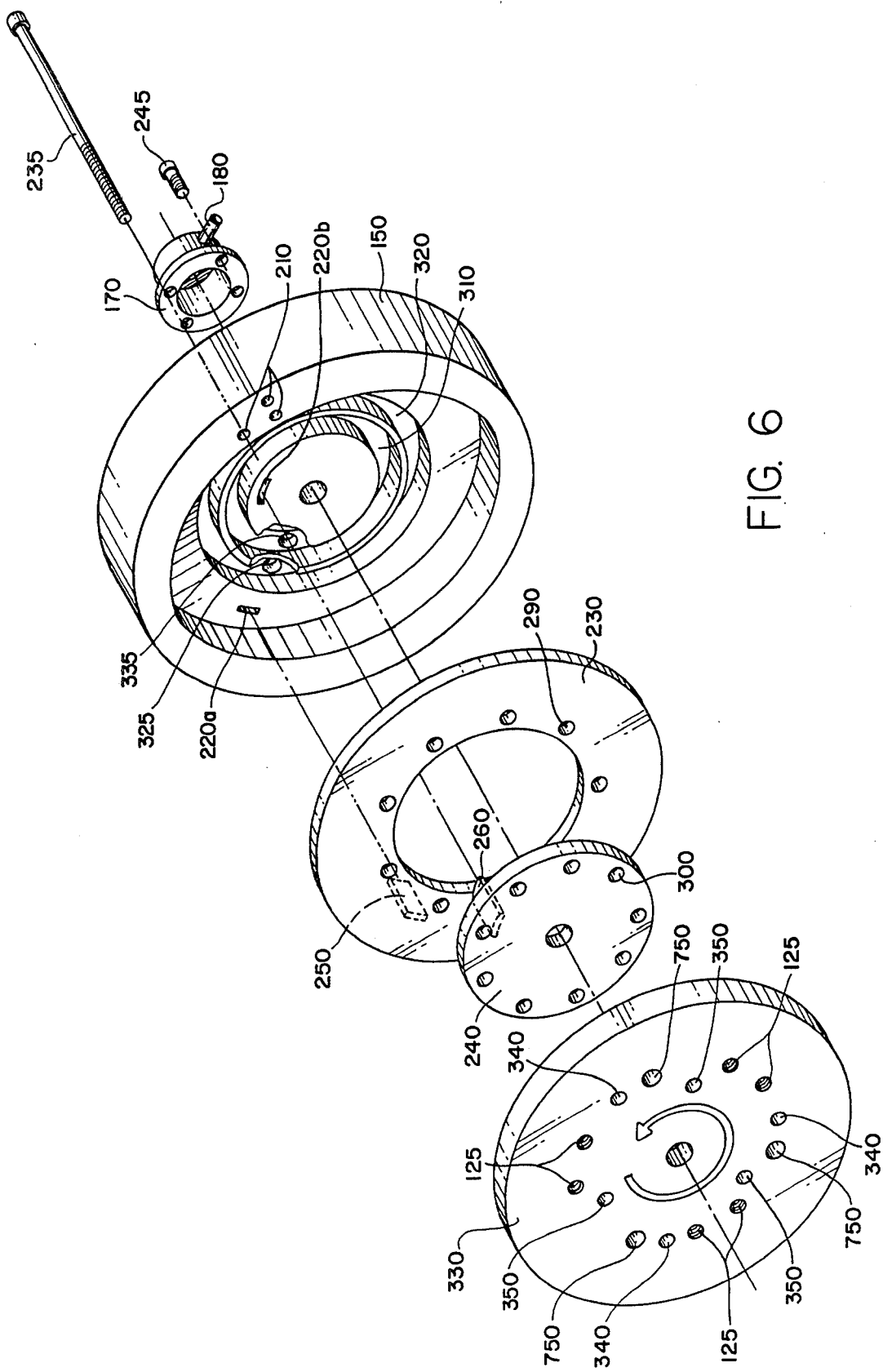
FIG. 6 is a perspective view of the front end of the engine/pump of FIG. 1.

FIG. 5 provides a view of the reactor portion of engine/pump 1 from the opposite side to that shown in FIG. 4. In this view it can be seen that segments 710, of drive plate 740, are rotating clockwise, as is exhaust/intake rotor 420. The secondary rotors 440, are set into a counter clockwise rotation on their axes which in turn rotate in a clockwise annular motion while interfacing with the stationary reactor lobes 460. Pressure seals 550 start a reciprocating action that is controlled by their contact with an arm of secondary rotors 440. When not in contact with one of the arms of secondary rotor 440, pressure seals 550 seat with the outer circumferential surface of segment 710 by means of pressure seal springs 650. It is noteworthy to observe at this point that secondary rotors 440, combustion rotor planetary gears 850 and secondary rotor shafts 450 are units which are machine pressed assemblies causing one each of rotors 440, shafts 450 and secondary rotor planetary gears 850 to become one married set. The exhaust/intake rotor 420, its shaft 430 and exhaust/intake rotor planetary gear 860, are also machine pressed to become a married set. Referring now to FIG. 6 there is shown the forward portion of engine/pump 1 including front case cover 150, stationary valve plates 230 and 240, and rotating valve plate 330. Rotating valve plate 330 is shown having intake ports 340, exhaust ports 350 and bearing holes 750. Tapped holes 125 are for receiving the threaded end portion of bolts 115 which pass through gear plate 740 and segments 710 threading and fastening into tapped holes 125. As a result, rotating valve plate 330 is rotating in the same direction as gear plate 740. As viewed in FIG. 6, this rotation is in the counterclockwise direction. Mounted forward of rotating valve plate 330 are stationary exhaust valve plate 240 and stationary intake valve plate 230. Stationary valve plates 240 and 230 are mounted concentrically one with the other. Stationary exhaust valve plate 240 is shown having exhaust ports 300 around its periphery and stationary intake valve plate 230 is shown having intake ports 290 around its inner circumferential surface. Each of the stationary valve plates have a tab 250 and 260 which mates with slots 220A and 220B, respectively, within the inner surface of front case cover 150. Tabs 250 and 260 extend through front case cover 150 and are locked in position by known means. To adjust the intake and exhaust timing the locking means is loosened and the tabs moved within slots 220A and B until the desired timing is achieved. Note, the timing can be adjusted while engine/pump 1 is operating.

When assembled, the intake ports 290 align with front cover annular groove 320 and the exhaust ports 300 align with front cover exhaust annular groove 310. Also shown in this figure are typical front case cover through bolt holes 210 which align with holes 830 in reactor lobe assembly 640 (FIG. 4), spacer ring through holes 840 and tapped holes 105 in rear case cover 950 (FIG. 3). The engine/pump 1 is assembled by slipping bolts 235 through holes 210, 830, 840 and screwing said bolt into tapped holes 105.

Additionally, in FIG. 6, a cooling inlet adapter 170 is shown having a tube 180 for receiving the coolant. Also shown are bolts 245 for connecting cooling inlet adaptor 170 to the forward surface of the front case cover 150 surrounding shaft 430 (FIG. 5). It should be noted at this point that the reactor assembly 640 (FIG. 4) has nine lobes 460 and therefore nine potential intake and firing positions. As a result, stationary valve plates 230 and 240 each have nine ports 290 and 300 respectively.

ENGINE OPERATION

Referring next to FIGS. 7 through 10 the operation of engine/pump 1 as an internal combustion engine having a four event combustion cycle is shown.

INDUCTION EVENT

Figure 7:
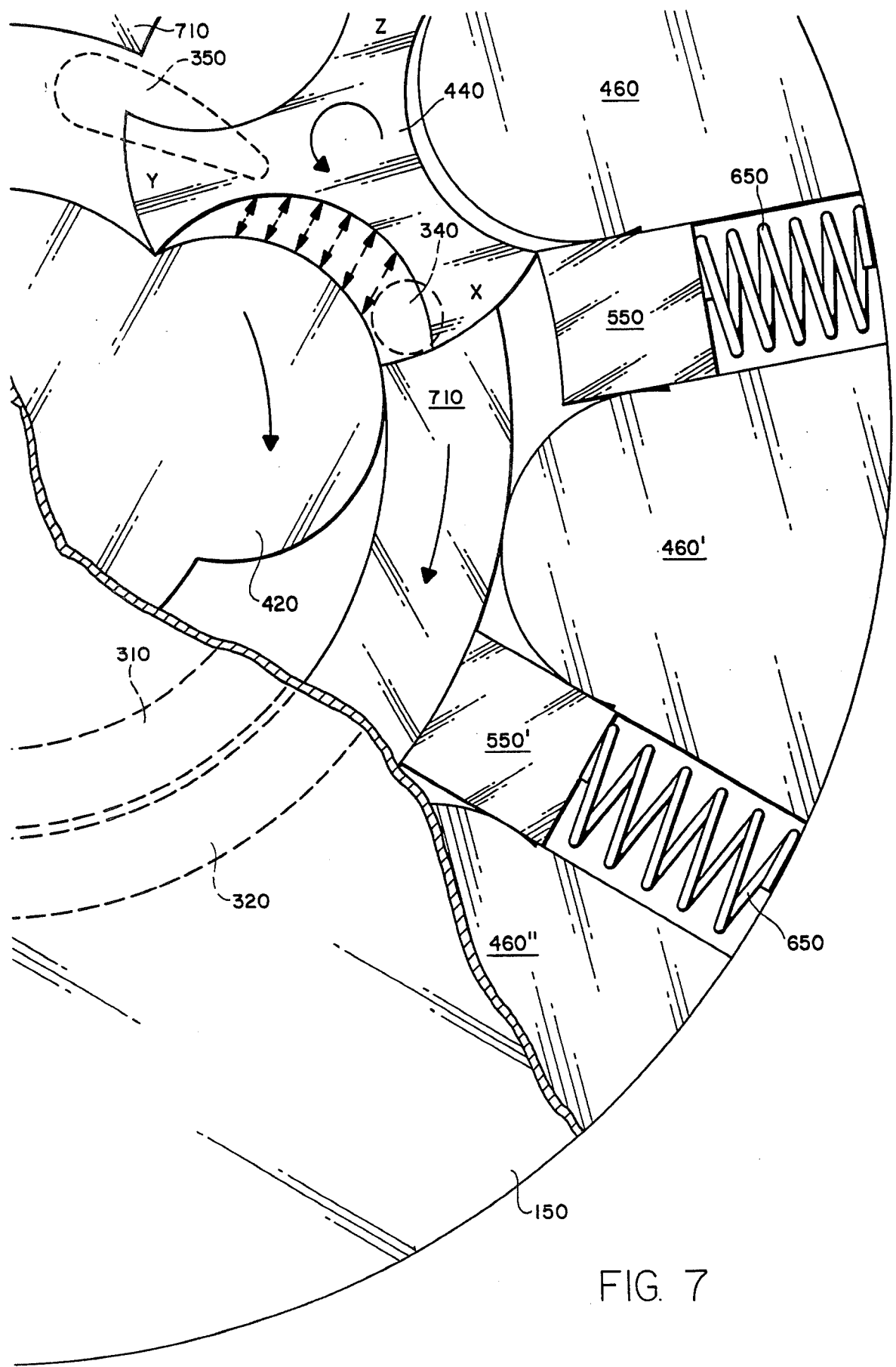
FIGS. 7-10 are partial cut-away close-up views from the front of the engine/pump illustrating the four event combustion cycle of the embodiment of FIG. 1.

A negative pressure is necessary to initiate the fuel induction through carburetor 10 to deliver an air/fuel mass through intake manifold 20 which delivers the air/fuel mass to intake ports 325 in front case cover 150. The internal induction event is shown in FIG. 7. The air/fuel mass when delivered to intake ports 325 is then distributed within front cover intake annular groove 320 where it awaits distribution by alignment of intake ports 290 in stationary intake valve plate 230 and intake ports 340 of rotating valve plate 330. The negative pressure or vacuum into which the awaiting air/fuel mass is drawn is generated by the movement of the adjacent lobe of exhaust/intake rotor 420 in a clockwise direction away from the concave surface of secondary rotor 440 between legs x and y. Combustion rotor 440 is rotating in a counterclockwise direction thereby increasing the volume of the region therebetween. The negative pressure is confined in this region by the sealing between exhaust/intake rotor 420, secondary rotor 440, segment 710, rotating valve plate 330, and gear plate 740. When this chamber achieves its maximum volume, intake ports 290 and 340 are no longer in alignment due to the rotation of rotating valve plate 330. As the rotation continues, the x leg of secondary rotor 440 begins to depress pressure seal 550 and as the lobe of exhaust-/intake rotor 420 moves downward, as does segment 710, the air/fuel charged chamber shifts and becomes adjacent to reactor lobe 460' as shown in FIG. 8.

COMPRESSION

Figure 8:
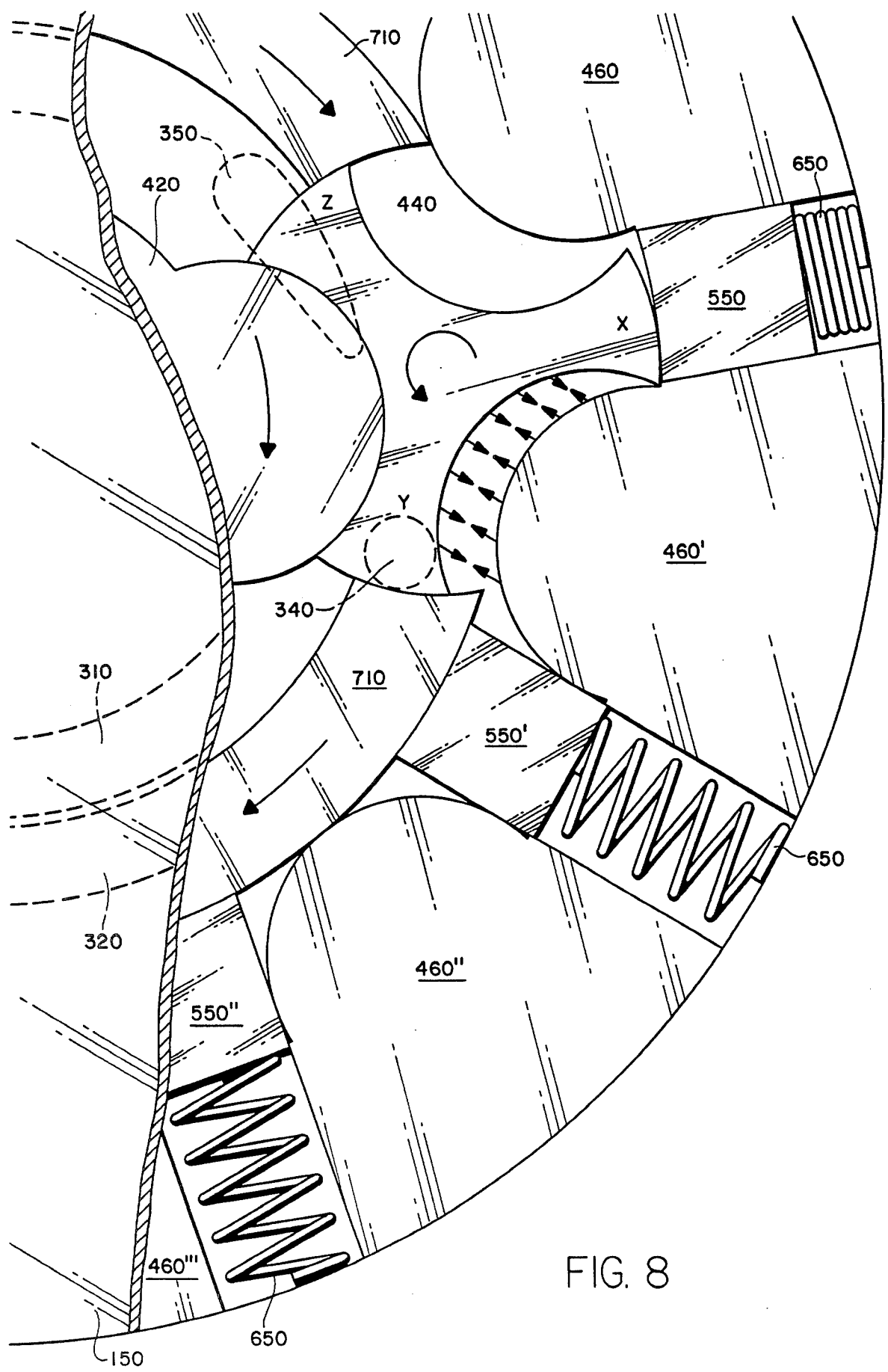

As induction is completed, further rotation and annular movement of the secondary rotors 440, in their respective 120° degree spaced apart locations, and further rotation and disalignment of stationary valve plate intake ports 230, rotating valve plate intake ports 340, and rotating valve plate intake ports 340, movement of segments 710, while sealing with the rotating valve plate 330, the gear plate 740, reactor lobe 460', secondary rotor 440 and pressure seal 550', causes the induced fuel/air mass to be contained as shown in FIG. 8. Compression now begins by further rotational movement of the rotating valve plate 330, segments 710, and the rotational and angular movement of the secondary rotors 440, to reduce the volume of the chamber formed by reactor lobe 460', segment 710 and poppet seal 550'.

COMBUSTION

Figure 9:
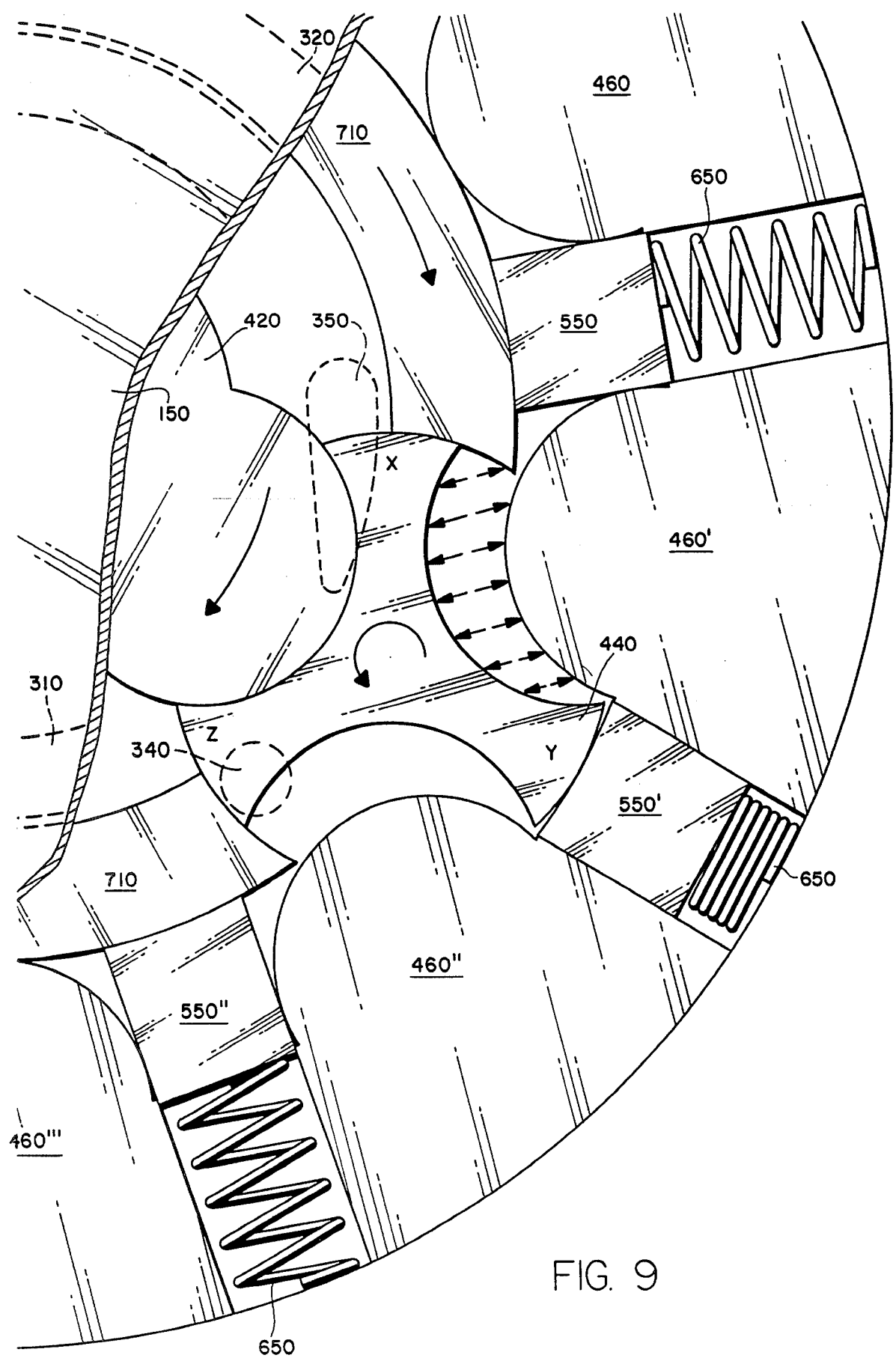

Compression has occurred by contact and interfacing as shown in FIG. 9 of reactor lobe 460', rotating valve plate 330, gear plate 740, segment 710, pressure seal 550', and secondary rotor 440. Ignition of the compressed air fuel mix can be accomplished by any known ignition technique including an electric spark ignition or compression ignition depending on the type of fuel utilized in the system. As combustion occurs, a moment arm effect of a lever of a second class is initiated by secondary rotor 440. This force is then transmitted by married components of the ring gear 960, which relates to an exact reverse of the description of preferred embodiments. The result is a second moment arm effect of a level of the first class between the axis of the secondary rotors 440 and the axis of the output shaft 920.

As the secondary rotor 440 turns further and after minimum chamber volume is achieved ignition occurs, thus generating combustion and gas pressure increases in the chamber formed by the secondary rotor 440, reactor lobe 460', pressure seal 550', segment 710, rotating valve plate 330 and gear plate 740.

EXHAUST

Figure 10:
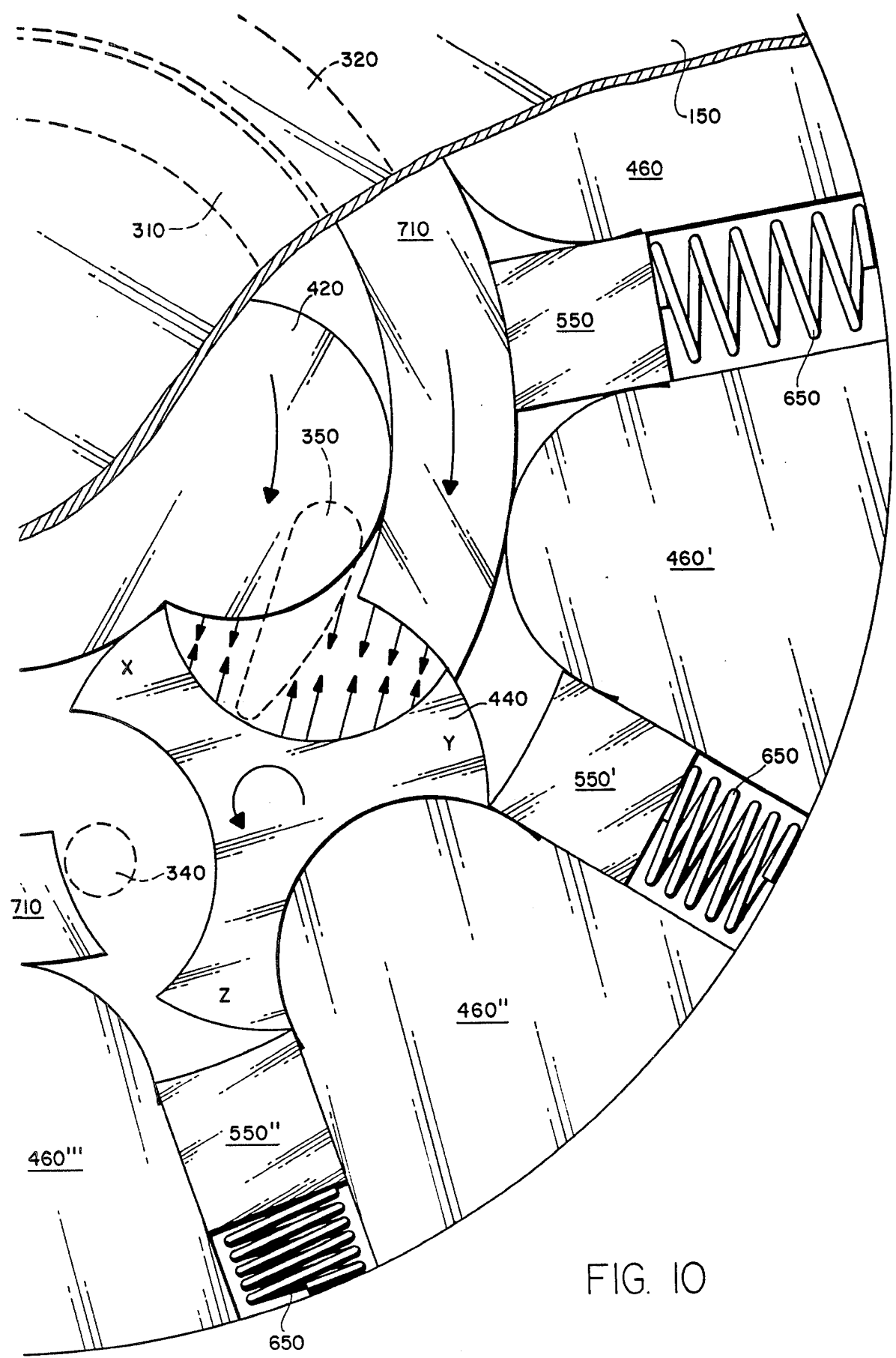

As seen in FIG. 10, the exhaust event is initiated by further rotational and annular movement of the various elements including secondary rotor 440 forming the exhaust cavity with a lobe of exhaust/intake rotor 420 and segment 710. As further rotational movement occurs, the lobe of exhaust-intake rotor 420 more closely meshes with the concave surface of secondary rotor 440. As the exhaust chamber volume decreases, the exhaust gases are forced out through port 350 in rotating valve plate 330, one of exhaust ports 300 in stationary exhaust valve plate 240 into front cover exhaust annular groove 310 and then exiting front case cover 150 through exhaust ports 335 into exhaust manifold 30 and to the outside atmosphere via muffler 40. The complete spent air/fuel mass is expelled from the engine by the meshing of the convex lobe of exhaust/intake rotor 420 with the concave surface of secondary rotor 440 since the shape of each is substantially the complement of the other. This then allows for a clean and more positive subsequent induction event.

MULTIPLE EVENTS

In FIGS. 7–10, the discussion traced the operation of engine/pump 1 with respect to the fuel/air mixture in conjunction with only one face of a single secondary rotor 440. The face between legs x and y. At the same time, the same series of events is taking place opposite a similar face of each of the other secondary rotors 440.

Additionally, each of the other faces of each of the secondary rotors 440 is experiencing the same events 120° advanced and delayed in time from those events discussed with respect to FIGS. 7–10. In other words, secondary rotor 440 face x-z is one step ahead of face x-y, whereas face y-z is one step behind face x-y. In FIG. 7, secondary rotor 440 face x-z is completing the compression event and face y-z is in the exhaust event. Similarly, in FIG. 8, face x-z is in the combustion event and face y-z is about to begin the intake event. In FIG. 9, face x-z has just completed the exhaust event and is prepared to start the intake event, while face y-z is in the compression event. Finally, in FIG. 10, face x-z is in the intake event and face y-z has completed the compression event and is ready for the combustion event.

COMPRESSION CONTROL

Figure 11:
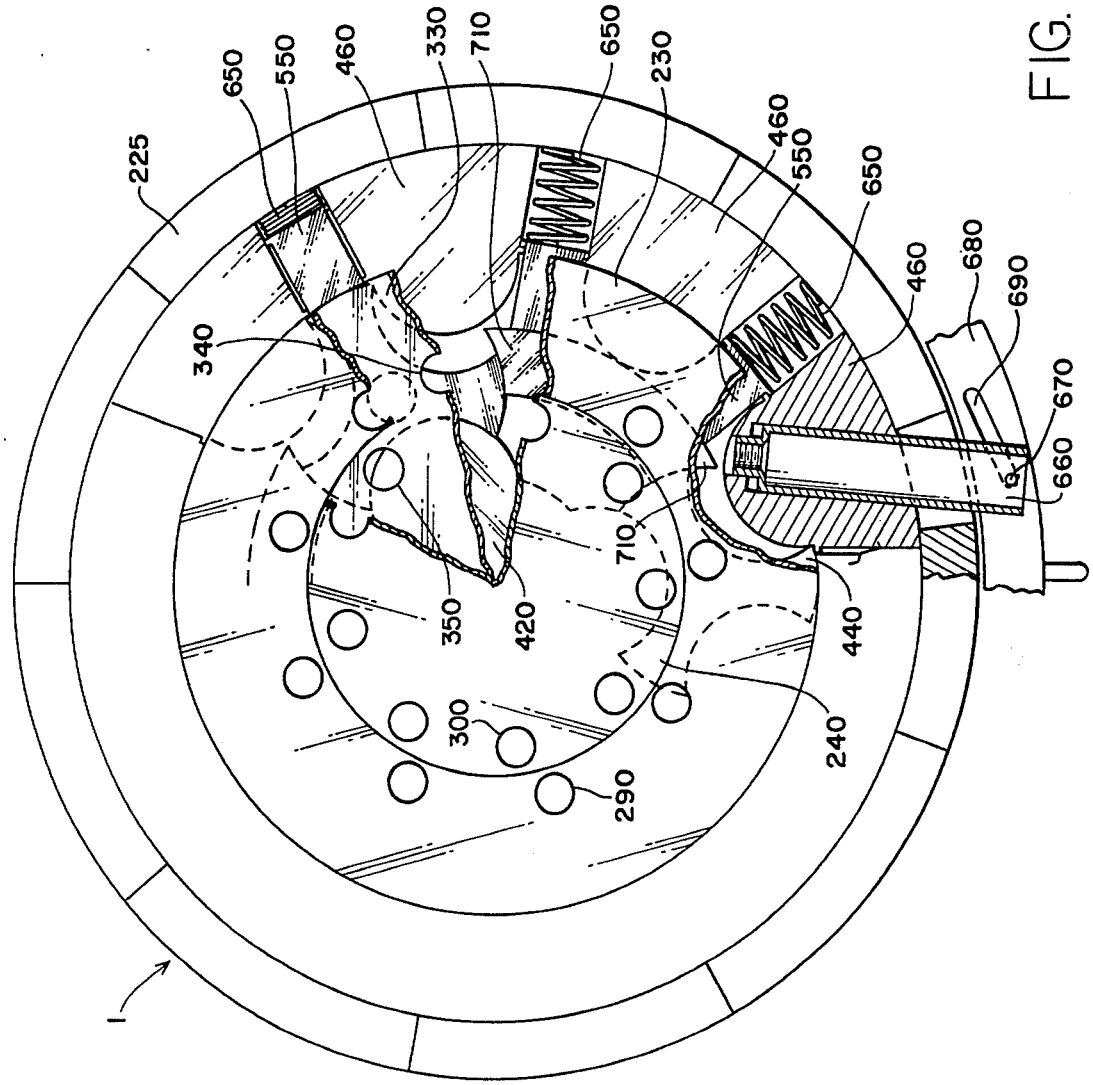
FIG. 11 is a partially cut-away/cross-sectional plane view of the front of the engine/pump of FIG. 1 showing compression control means.

Referring next to FIG. 11, engine/pump 1 is shown having the front case cover 150 removed and a partial cutaway of stationary valve plates 230 and 240 and rotating valve plate 330. In addition, one of reactor lobes 460 is shown in cross-section having inserted therein a typical compression adjustment plunger 660. The outer end of compression adjustment plunger 660 is connected to compression adjustment cam rail 680 by means of pin 670 in guide slot 690. Each of reactor lobes 460 would be equipped with a compression adjustment plunger 660 similarly connected to cam rail 680. In a typical arrangement, cam rail 680 encircles reactor lobe assembly 640. With this arrangement the compression of engine/pump 1 can be varied as necessary as dictated by load, fuel efficiency determined during operation of engine/pump 1, or the type of fuel being supplied to engine/pump 1. These adjustments can be made while engine/pump 1 is in operation or at rest. Compression is varied by selectively moving cam rail 680 which adjusts compression plunger 660 via slot 690 and pin 670. It should be noted that these adjustments only have an affect during the compression event.

Compression adjustment plunger 660 is sized to accomodate a spark plug. In the position shown in FIG. 11, the compression within the internal cavity of engine/pump 1 is at its minimum. As cam rail 680 is rotated clockwise, compression adjustment plunger 660 is driven further into reactor lobe 460, the volume of the internal cavity is reduced, thus increasing the compression of that chamber of engine/pump 1.

While it is unlikely that anyone would want to run engine/pump 1 on different fuels simultaneously, it is possible to segment cam rail 680 and control the compression of each chamber individually or in groups.

INDUCTION NEGATIVE PRESSURE ADJUSTMENT

By adjusting the relationship between stationary intake valve plate 230 and stationary exhaust plate 240, one with respect to the other, as well as, with respect to intake and exhaust ports 325 and 335, respectively, the negative pressure during the induction event can be varied.

Figure 12A:
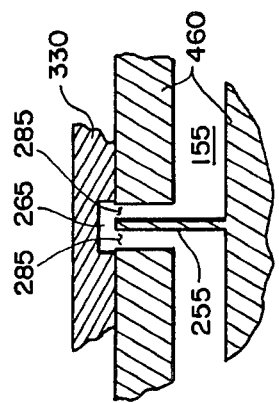
FIG. 12A shows a cross-sectional view of the inlet port of FIG. 12 along line A—A of FIG. 12.
Figure 12:
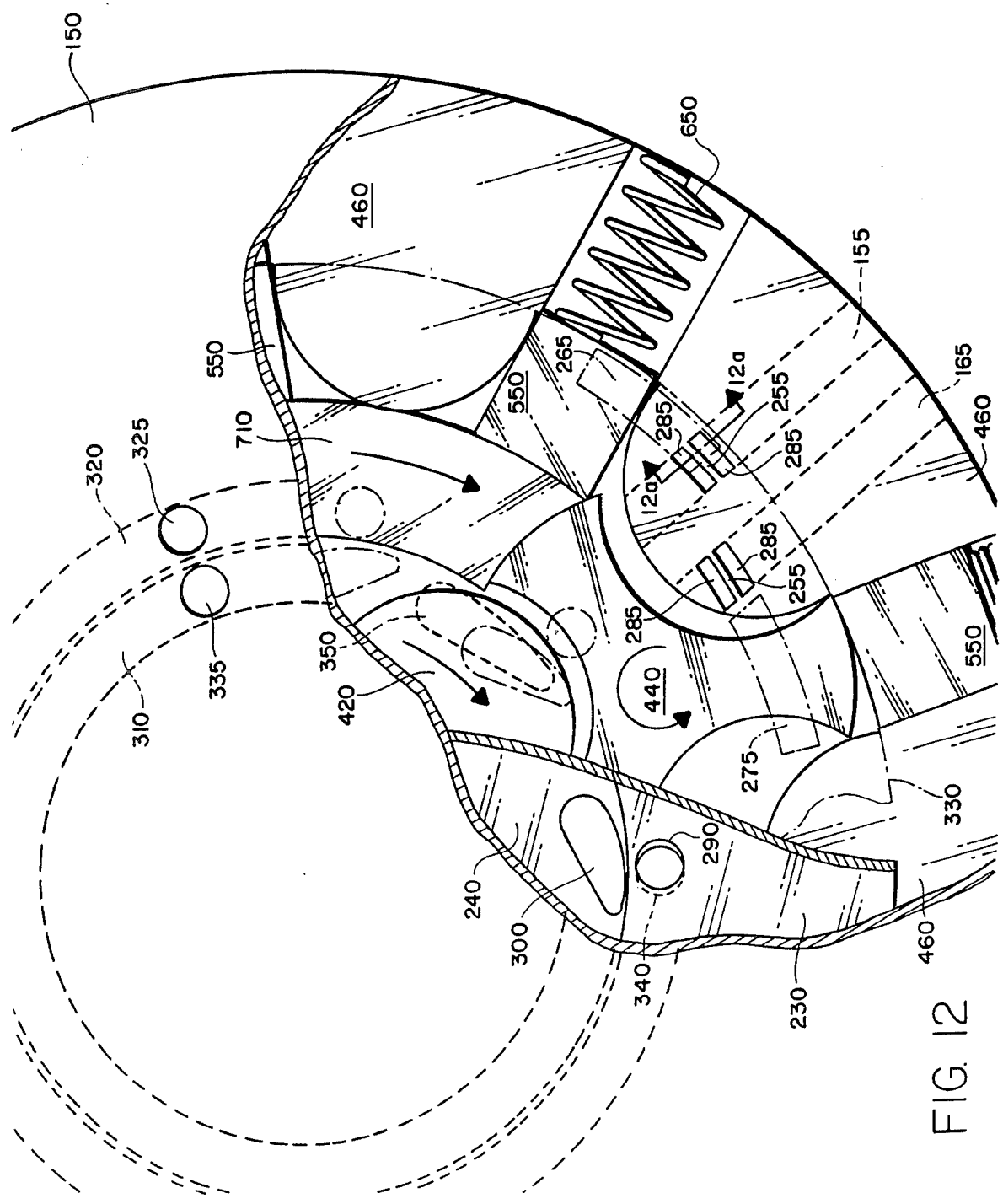

FIGS. 12 and 13 show modifications of engine/pump 1 for use as a pump or a fluid powered motor. In each of these configurations, in addition to the intake and exhaust porting systems discussed earlier which will be referred to as inlet and discharge systems in this portion of the discussion, through each of reactor lobes 460 second inlet and discharge ports 155 and 165, respectfully, are provided. In FIG. 12 each of these ports includes a septum 255 which effectively cuts each of these ports into two distinct sections having two windows 285 through the front surface of reactor lobe 460. Rotating valve plate 330 is designed to seal windows 285 except when intake channel 265 or exhaust channel 275 is directly above them. FIG. 12A shows the cross-sectional view of inlet port 155 along line A—A in FIG. 12. Discharge port 165 is similar in construction to inlet port 155. In this view we can see septum 255 dividing the port into two sections with two windows 285 opening through the top surface of reactor lobe 460. When rotating valve plate 330 is positioned such that intake channel 265 or exhaust channel 275 is directly above septum 255 the port is connected through to the interior cavity between reactor lobe 460 and secondary rotor 440. FIG. 13 shows a second approach to inlet port 155 and discharge port 165. In FIG. 13 a ball check valve 175 or 185 is incorporated into each port to seal the port from the fluid mass flowing in the opposite direction.

PUMP OPERATION

The combination of the inlet and discharge ports 155 as shown in FIGS. 12, 12A and 13, together with the design disclosed in FIGS. 1-11 will permit engine/pump 1 to function as a fluid pump. In summary, the operation of engine/pump 1 as a pump can be seen by viewing FIGS. 7-10 and 12-13, assuming that inlet port 155 and discharge port 165 have been incorporated into each of reactor lobes 460 and a motor is driving flywheel 145 or output shaft 920. Thus, in FIG. 7 a fluid mass is being drawn into the cavity between legs x and y of secondary rotor 440 through intake port 340, the fluid charge in the cavity between legs y and z of secondary rotor 340 is nearly completed its discharge through discharge port 165. As engine/pump 1 is advanced its elements move to the positions shown in FIG. 8. The fluid charge received in the cavity between legs x and y of secondary rotor 440 as shown in FIG. 7 is being discharged through discharge port 165 through reactor lobe 460'. The fluid charge in the cavity between legs y and z of secondary rotor 440 which began its discharge through exhaust port 350 is not completely discharged, and a new fluid charge is being drawn into the cavity between legs x and z of secondary rotor 440 through inlet port 155 of rector lobe 460. Following the discharge of the fluid at reactor lobe 460' as the internal parts of the engine/pump continue to advance (FIG. 9) a new fluid charge is taken into the cavity between legs x and y of secondary rotor 440 through inlet port 155 in reactor lobe 460'. Between the positions shown in FIGS. 8 and 9 a new fluid charge was taken on in the cavity between legs y and z of secondary rotor 440 through intake port 340 and is now shown in the begining stages of being discharged through discharge port in reactor lobe 460''. Similarly, the fluid charge in the cavity between legs x and z of secondary rotor 440 was discharged through exhaust port 350 between the positions shown in FIGS. 8 and 9. The completion of the cycle is shown in FIG. 10 with the x-y charge being discharged through exhaust port 350, the y-z charge having completed discharge through discharge portion 165 in reactor lobe 460'', and a new charge being taken on between x-z through intake port 340.

It should be mentioned that throughout the 13 figures of this specification the inlet and exhaust ports shown through the reactor lobes, the spark plug positions and the compression adjustment means have been shown at a single reactor lobe in the reactor lobe assembly 640. This was done to simplify the discussion and the drawings, however, in an operational unit each reactor lobe would incorporate these various elements.

In FIG. 13 there are shown ball check valves 175 and 185 in the inlet port 155 and the discharge port 165, respectively. Each of ball check valves 175 and 185 are spring biased to prevent the reverse flow of fluid therethrough during the fluid pumping operation. Additionally, the spring tension of the spring in inlet ball check valve 175 is selected to permit the free flow of a fluid mass into turbine 1 in opposition to that spring in response to negative pressures developed within turbine 1.

FLUID POWERED MOTOR OPERATION

The configuration of FIG. 12 also lends itself to the operation of engine/pump 1 as a pressurized fluid powered motor. Conceptually, engine/pump 1 operates as a fluid powered motor as it did as a pump in the discussion above. The only difference is that the fluid charge is injected through intake ports 340 and inlet port 155 under pressure.

In FIG. 12, the pressurized fluid injected through inlet 155 passes through intake channel 265 in rotating valve plate 330, and into the chamber between reactor lobe 460 and secondary rotor 440. As force is applied to the face of secondary rotor 440, it rotates counterclockwise. This rotation of the secondary rotor 440 causes the combustion rotor 440 axis to rotate clockwise relative to the central axis of engine/pump 1.

This motion causes clockwise rotation of the rotating valve plate 330 carrying intake channel 265 away from windows 285 closing inlet port 155.

As secondary rotor 440, rotates counterclockwise it approaches a lobe of the exhaust/intake rotor 420, causing the working chamber to diminish in volume and thereby causing the fluid to be discharged out aligned exhaust ports 300 and 350. Alignment of stationary intake port 290, and rotating intake port 340, allows the pressurized fluid to enter the working chamber causing the secondary rotor 440 to continue turning counter clockwise away from the exhaust/intake rotor 420. This continuing rotation causes the rotating valve exhaust plate 240 to move clockwise and align exhaust channel 275 with windows 285 in discharge port 165, thereby discharging the spent fluid.

This cycle continues simultaneously on all three faces of each secondary rotor 440 and throughout a full 360° of rotation of engine/pump 1.

We claim:

1. A rotary engine/pump for fluid pumps, fluid motors, combustion engines and the like comprising:

reactor lobe means defining an interior cavity having a plurality of radially arranged inwardly projecting convex reactor lobes;

an exhaust-intake rotor having a shaft extending therethrough journalled concentrically with the axis of, and within the reactor lobe means, said exhaust-intake rotor having convex lobes;

a multiplicity of secondary rotors each having a shaft extending therethrough, rotatably mounted equidistant from each other intermediate the convex lobes of the reactor lobe means and the exhaust-intake rotor with their shafts substantially parallel to the shaft of the exhaust-intake rotor, each of said secondary rotors having three radially outwardly extending legs defining a concave cavity between each pair of said legs;

gear plate means adjacent one end of the reactor lobe means including:

plate means having one end of the shafts of said exhaust-intake rotor and said secondary rotors journalled therethrough; and segment means extending from the plate means into the reactor lobe means intermediate the convex reactor lobes and the exhaust-intake rotor for separating said secondary rotors from each other and limiting the working areas of the engine/pump to substantially the cavities between each pair of legs of each secondary rotor; and gear drive means coupled to the exhaust-intake rotor and each of the secondary rotors for providing rotational movement of the exhaust-intake rotor, the secondary rotors and the gear plate means with each of the secondary rotors rotating on its individual shaft in one direction and the entire assembly of the exhaust-intake rotor, the secondary rotors and the gear plate means rotating in the opposite direction;

said exhaust-intake rotor having as many lobes as there are secondary rotors and said reactor lobe means having three times as many reactor lobes as there are secondary rotors.

2. A rotary engine/pump as in claim 1 further comprising pressure seal means intermediate each pair of reactor lobes for maintaining a seal between the segment means and the legs of the secondary rotor during the operation of the engine/pump.

3. A rotary engine/pump as in claim 2 wherein the concave cavities of the secondary rotor, the reactor lobes, and the lobes of the exhaust-intake rotor are sized and shaped to substantially mate with each other as rotation presents one to the other.

4. A rotary engine/pump as in claim 3 further comprising valve means for timing the intake and discharge of fluids and gases to and from preselected regions of the engine/pump.

5. A rotary turbine as in claim 4 wherein:
said valve means includes:
a rotating valve plate juxtaposed to the other end of the reactor lobe means, and fixedly mounted on the other end of the shaft of the exhaust-intake rotor, and having the other end of the shafts of each of the secondary rotors journalled therewithin, said rotating valve plate defining a preselected pattern of intake and discharge ports; and stationary valve plate means adjustably mounted juxtaposed said rotating valve plate and defining in a preset pattern intake and discharge ports for adjusting the timing of the intake and discharge of the fluids and gases from the engine/pump; and said engine/pump further includes a front case cover closing on the outer perimeter of the reactor lobe means and enclosing said valve means, said front case cover also defining an intake port and a single discharge port each in communication with an annular groove disposed juxtaposed the intake and discharge ports of the stationary valve plate means.

6. A rotary engine/pump as in claim 5 wherein:
said stationary valve plate means includes:
a stationary discharge valve plate having discharge timing adjustment means affixed thereto and extending through said front case cover; and
a stationary intake valve plate mounted concentrically with and surrounding the periphery of said stationary discharge valve plate having intake timing adjustment means affixed thereto and extending through front case cover; and
said other end of the shaft of the exhaust-intake rotor being journalled within said stationary discharge valve plate.

7. A rotary engine/pump as in claim 6 wherein:
said other end of the shaft of the exhaust-intake rotor is journalled within and passes through the front case cover;
said engine/pump further includes:
ignition means through and communicating with the inner surface of each of said reactor lobes for causing combustion of a selected fuel; and
distribution means operably coupled to the other end of the shaft of the exhaust-intake rotor for providing a timed ignition spark.

8. A rotary engine/pump as in claim 4 further comprising compression adjustment means through each of said reactor lobes for adjusting the internal compression to match that required for the type of fuel to be used to power the engine/pump.

9. A rotary engine/pump as in claim 8 wherein said compression adjustment means includes:
cylinder means slidably mounted within each reactor lobe for varying the internal compression between the reactor lobe and two legs of an adjacent secondary rotor by varying the volume of the cavity so formed by varying the depth to which said cylinder means is inserted; and
cam rail means for adjusting the insertion depth of the cylinder means.

10. A rotary engine/pump as in claim 4 further including fluid inlet and discharge means through each of said reactor lobes extending from the outer circumference of the reactor lobe means inward to the convex face of the reactor lobe for increasing the fluid motor and fluid pump capacity of the engine/pump.

11. A rotary engine/pump as in claim 5 further including fluid inlet and discharge means through each of said reactor lobes extending from the outer circumference of the reactor lobe means inward to the convex face of the reactor lobe for increasing the fluid motor and fluid pump capacity of the engine/pump.

12. A rotary engine/pump as in claim 10 wherein each of said inlet and discharge means includes unidirectional flow means for controlling fluid flow therethrough.

13. A rotary engine/pump as in claim 11 wherein each of said inlet and discharge means includes unidirectional flow means for controlling fluid flow therethrough.

14. A rotary engine/pump as in claim 12 wherein said unidirectional flow means includes ball check valve means for limiting fluid flow to a single selected direction in each of the fluid inlet and discharge means.

15. A rotary engine/pump as in claim 13 wherein said unidirectional flow means includes ball check valve means for limiting fluid flow to a single selected direction in each of the fluid inlet and discharge means.

16. A rotary engine/pump as in claim 10 wherein each of said inlet and discharge means includes:
 a septum dividing each of the inlet and discharge mmeans into two substantially L-shaped ports each opening to the side of the reactor lobe adjacent to the valve plate means; and
 channel means in the valve means for coupling the two L-shaped ports when said channel is disposed opposite the port openings in the side of the reactor lobe to permit fluid flow through the inlet and discharge means in the selected direction.

17. A rotary engine/pump as in claim 11 wherein each of said inlet and discharge means includes:
 a septum dividing each of the inlet and discharge means into two substantially L-shaped ports each opening to the side of the reactor lobe adjacent to the valve plate means; and
 channel means in the valve means for coupling the two L-shaped ports when said channel is disposed opposite the port openings in the side of the reactor lobe to permit fluid flow through the inlet and discharge means in the selected direction.

18. A rotary engine/pump as in claim 16 wherein said channel means are in the rotating valve plate allowing timing of the opening and closing of the inlet and discharge means when the secondary rotor is in the proper position relative to the reactor lobe.

19. A rotary engine/pump as in claim 17 wherein said channel means are in the rotating valve plate allowing timing of the opening and closing of the inlet and discharge means when the secondary rotor is in the proper position relative to the reactor lobe.

* * * * *